Figure 6:
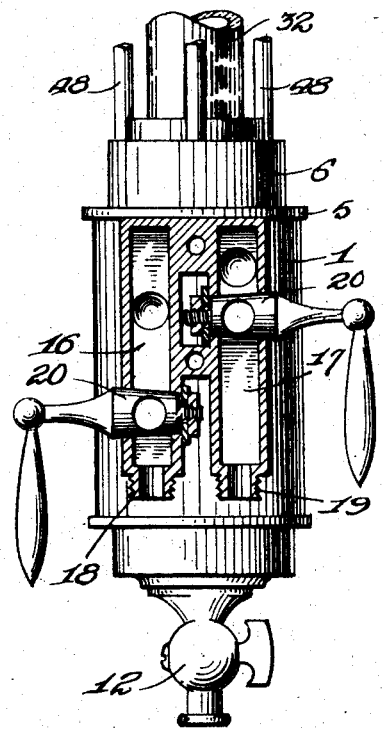

Z. H. STAMETS.
LIQUID FUEL PURIFIER AND GAGED GOVERNOR.
APPLICATION FILED MAR. 25, 1910.
972,282.
Patented Oct. 11, 1910.
2 SHEETS—SHEET 1.
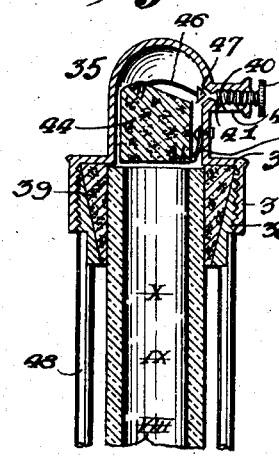
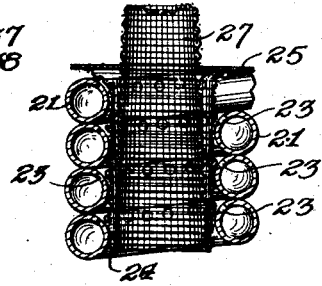
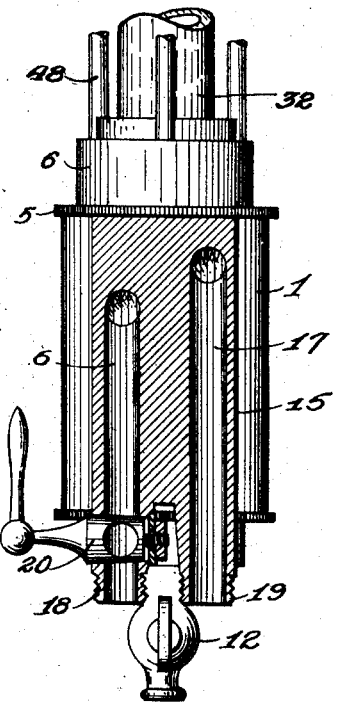
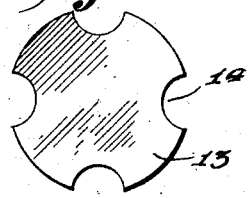
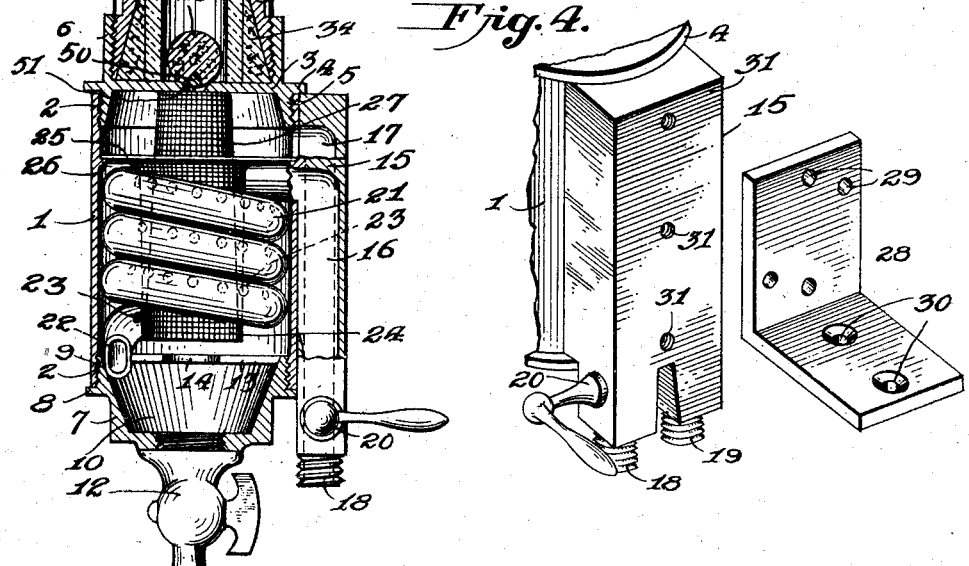
Witnesses
Inventor
Zeanith H. Stamets,
By E. E. Vrooman,
his Attorney.
THE NORRIS PETERS CO., WASHINGTON, D. C.

Z. H. STAMETS.
LIQUID FUEL PURIFIER AND GAGED GOVERNOR.
APPLICATION FILED MAR. 25, 1910.

972,282.

Patented Oct. 11, 1910.
2 SHEETS—SHEET 2.

Witnesses
C. Everett Lancaster.
Irw. L. McCathran.

Inventor
Zeanith H. Stamets.
By E. E. Vrooman,
his Attorney.

UNITED STATES PATENT OFFICE.

ZEANITH H. STAMETS, OF AUBURN, INDIANA.

LIQUID-FUEL PURIFIER AND GAGED GOVERNOR.

972,282.  Specification of Letters Patent. Patented Oct. 11, 1910.

Application filed March 25, 1910. Serial No. 551,501.

*To all whom it may concern:*

Be it known that I, ZEANITH H. STAMETS, a citizen of the United States of America, residing at Auburn, in the county of Dekalb and State of Indiana, have invented certain new and useful Improvements in Liquid-Fuel Purifiers and Gaged Governors, of which the following is a specification, reference being had therein to the accompanying drawing.

This invention relates to filters, and has for its object to provide an improved filter by means of which gasolene, and other liquid fuel, may be effectively filtered by causing the liquid to circulate with a whirling movement through the filter and thereby separate the impurities therefrom and cause them to be deposited in a sediment chamber.

The invention further has for its object to provide an improved filter by means of which gasolene, or other liquid fuel, circulating through the filter will be regulated accordingly as the flow is retarded or increased and back-pressure of the circulating liquid be provided for.

The invention further has for its object to provide an improved form of filter by means of which gasolene or other liquid fuel will be caused to circulate with a whirling movement through the filter and thereby separate the impurities from the liquid fuel and cause a portion of the purified liquid fuel to be delivered into an auxiliary storage chamber.

These and other objects of the invention will appear in the course of the following specification.

Referring to the accompanying drawing,—Figure 1 is a view in elevation, and partly in vertical section, of an improved filter constructed in accordance with this invention. Fig. 2 is an enlarged detail view, partly in vertical section, of a portion of the filter. Fig. 3 is a detail view in vertical section, showing a portion of the filtering coil and screen. Fig. 4 is a view in perspective of a portion of the filter and means for securing it in position to a vehicle or other object. Fig. 5 is a detail view showing the diaphragm removed from the sediment chamber. Fig. 6 is a detail view partly in section of a modified form of the filter as shown in Fig. 2.

In carrying out the invention, a filter is shown and described which is especially adapted for use with automobiles, but which may be used with other constructions.

The filter comprises a cylindrical casing 1 of metal of a size adapted for use with an automobile, the casing 1 having internally threaded ends 2, the upper end being closed by a cap 3 having an annular horizontal flange 4, a cylindrical depending flange 5 which is held in threaded engagement with the upper threaded end 2 of the cylinder 1 and a vertical cylindrical flange 6. The lower end of the cylinder 1 is closed by means of a cap 7 having an annular flange 8 which rests against the end of the casing 1 and a vertical threaded annular flange 9 which is in threaded engagement with the lower threaded end 2 of the casing. The cap 7 is formed with a sediment chamber 10 having an opening in its bottom with which is connected in threaded engagement a cock 12. The top of the sediment chamber 10 is closed by means of a diaphragm 13 provided at its periphery with a number of semi-circular depressed openings 14 through which the sediment may pass.

Secured to the side of the casing 1 in any suitable manner is a base or supporting portion 15 consisting of an oblong, rectangular block provided on its inner face with two vertical passageways 16 and 17, said passageways 16 and 17 being open on the side adjacent to the casing 1 and closed by the side of the casing 1. Each of the passageways 16 and 17 has a depending tubular portion 18 and 19, respectively, the passageway 16 being the inlet passageway connected by the open threaded portion 18 with a suitable pipe (not shown) leading to the supply tank (not shown). The passageway 17 is the outlet passageway which is connected with a pipe (not shown) connected with the threaded end 19, said pipe leading to the carbureter of an automobile or other place to supply. The flow of gasolene or other liquid fuel from the main supply tank to the inlet passageway 16 is controlled by a cock 20.

Located in the casing 1 is a coil 21 having its upper end connected with the upper end of the inlet passageway 16 and its lower end formed with an oval opening 22 projecting through one of the openings 14 through the disk 13 into the sediment chamber 10. The coil 21 is provided with a number of holes 23 located in the upper side of the inner convolutions of the coil. A cylindrical screen 24, open at its bottom and having an annular flange 25 at its top, extends down through said coil 21, said flange 25 resting on a shoulder 26 in the interior of the casing 1 just above the top of the coil 21. A second screen 27 closed at its top and open at its bottom in the form of a frustum of a cone is mounted in and secured to the screen 24 and projects above the top of the latter to a point even with the top of the casing 1. It will be noticed that the upper end of the passageway 17 or the outlet passageway communicates with the space in the casing 1 above the flange 25 of the screen. It will also be noted that when the cap 3 is screwed down onto the top of the casing 1, it will bear against the upper end of the screen 27 and thereby cause the flange 25 of the screen 24 to be pressed against the annular shoulder 26.

The base portion 15 is screwed to an automobile or other object to which the filter is to be attached by means of an angle iron piece 28 having its vertical portion provided with sets of holes 29 and its horizontal portion with holes 30, the holes 30 adapting the plate 28 carrying the filter to be adjusted to different positions by changing the screws passing through the holes 30. The holes 29 in the vertical portion of the angle iron 28 are utilized to connect by means of screws and secure the base portion 15 in different vertical positions on the angle iron 28 by engaging the holes 31 placed at different elevations on the base portion 15.

Mounted on the top of the casing 1 is a graduated glass cylinder 32 which serves both as a gage and as an auxiliary chamber or reservoir for the purified liquid fuel. The lower end of the glass cylinder 32 rests on the top of the cap 3 and is secured in place thereon by means of a cylindrical collar 33 which is in threaded engagement with the cylindrical flange 6 of the cap 3, the inner face of the cylindrical collar 33 being tapering to conform to the tapering outer surface of a cork gasket 34 which is compressed between the collar 33 and the glass cylinder 32, the several parts named forming a tight joint for the lower end of the cylinder 32. Mounted above the upper end of the cylinder 32 is a metal cap 35 which is formed with an annular horizontal portion 36 having a depending, annular internally-threaded flange 37 which is in threaded engagement with a metallic threaded collar 38 having an inner tapering surface, which bears against the outer tapering surface of a cork gasket 39 compressed between the glass cylinder 32 and the collar 38. The cap 35 is provided with a lateral projection 40 having an internal passageway 41 with a lateral opening 42, said opening and passageway being controlled by a set screw 43. Mounted in the interior of the cap 35 is the cork float 44 which is connected at one of its lower corners by means of a hinge 45 to the side of the cap 35. The upper part of the cork float 44 is provided with an arm 46 having at its end a head 47 which is adapted to close the inner end of the passageway 40 when the cork float 44 is lifted by the rise of the liquid to the top of the cylinder 32. The glass cylinder 32 is protected by means of spaced rods 48 having their ends secured in any suitable manner to the caps 33 and 38. The height of the liquid in the cylinder 32 is indicated by means of a float 49 which may have its upper and lower halves painted in different colors, and which is weighted by means of a weight 50 on one side thereof. The float 49 when the liquid is exhausted from the cylinder 32 closes the tapering opening 51 in the top of the cap 3.

It will be seen that by means of this construction when, for example the flow is connected with the carbureter of an automobile, liquid being admitted from the supply tank to the inlet passageway 16 will circulate from the coil 21 with a whirling movement thereby causing the heavier particles of impure matter in the liquid fuel to fall to the lower side of the convolutions of the coil and the lighter particles of gasolene to pass out through the holes 23 in the upper inner side of the inner convolutions of the coil, and then be carried with a whirling movement through the screens 24 and 27. The heavy impure matter passes down through the coil 21 and out through its end 9 into the sediment chamber 10 where it may be drawn off as desired. By having the two screens, as set forth, a thorough filtering of any superfluous matter that may have escaped through the holes 23 will be separated and the purified liquid carried off through the exit passageway 17 to the carbureter.

As the gasolene, or other liquid fuel, circulates through the filter and is carried off to the carbureter, a portion of the purified liquid fuel will be carried into the cylinder 32, the height of the liquid in the cylinder 32 being governed by the amount of liquid in the main supply reservoir and indicated by the height of the float 49 in the graduated cylinder 32.

In case of irregular movements of an automobile should there be any excess pressure to the carbureter, the excess of liquid will pass up into the cylinder 32 thereby relieving the pressure on the carbureter. The set screw 43 may be loosened to permit a certain amount of air to have access to the cap 35 of the cylinder 32, and in case of any irregular motion of the automobile and the liquid is drawn out of the cylinder 32, the ball valve 49 will close the opening 51 and prevent the entrance of air.

By means of such automatic feed governor as hereinbefore set forth in the form of a gage or circulating reservoir, a reserve supply of purified liquid fuel is at hand to maintain the proper feed with each intake of the engine of an automobile. The device is automatic in its operation, and together with the filter provides an automatic feed governor which evenly regulates the pressure volume, and flow of the liquid fuel and prevents irregularities of the carbureter.

What I claim as my invention is:—

1. In a device of the character described, a casing provided with a sediment chamber in its lower end and an apertured diaphragm covering said sediment chamber, a supporting base mounted on the side of said casing and having an inlet fuel supply passageway and means for connecting it with a main supply tank, an outlet passageway and means for connecting it with a carbureter or other point to be supplied, a coil located in said casing and having its upper end connected with one end of said inlet passageway and its lower end projecting into said sediment chamber, said coil having perforations on the upper side of its inner convolutions, a screen separating the lower portion of said casing from the upper portion, the inner portion of the outlet passageway communicating with the upper portion of the casing above said screen, a gage cylinder forming an auxiliary reservoir mounted on the top of said casing, and means for controlling the passage of liquid from said casing to said auxiliary reservoir.

2. In a device of the character described, a casing provided with a sediment chamber at its lower end, a perforated diaphragm covering the top of said sediment chamber, a securing base mounted on one side of said casing and having inlet and outlet liquid circulating passageways, means adapted to connect one of said passageways with a main supply tank and the other with a carbureter, a coil mounted in said casing and having its upper end connected with the inlet liquid supply passageway and its lower end projecting into the sediment chamber, said coil having perforations in the upper side of its inner convolutions, a double screen projecting through said coil and having an annular reticulated flange separating the upper portion of said casing from the lower portion, a glass cylindrical gage forming an auxiliary reservoir mounted on the top of said casing and communicating therewith, a float located in said gage, a hinged float and valve located in the upper end of said glass gage, and means for controlling the passage of air to said gage.

3. In a device of the character described, a casing provided with movable caps at its end, one of said caps being formed with a sediment chamber having a perforated diaphragm at its top, and the other cap having a central opening formed with a valve seat, a coil in said casing having apertures in the upper inner sides of its convolutions, the upper inlet end of said coil being located adjacent to the upper end of said casing and the lower end of the coil projecting into the sediment chamber, a screen in said casing having a reticulated diaphragm separating the upper portion of the casing from the lower portion, an attached base portion mounted on the side of said casing, and having an inlet and an outlet passageway, the inlet passageway communicating with the upper end of the coil below the reticulated diaphragm and the outlet passageway communicating with the upper portion of the casing above said diaphragm, and a gage cylinder forming an auxiliary liquid supply chamber mounted on the top of said casing and provided with a float valve adapted to close said opening in the top of the casing.

4. In a device of the character described, a casing provided with a base portion mounted on one side of said casing and having vertical inlet and outlet liquid passageways, means for adjustably securing said base portion to a vehicle or other object, a coil located in said casing having its upper end communicating with the inlet passageway and its lower end projecting into a sediment chamber in said casing, a reticulated diaphragm separating the upper portion of the casing from said coil, said upper portion communicating with said outlet passageway, a gage cylinder forming an auxiliary liquid supply chamber mounted on the top of said casing and communicating therewith and having a float valve therein adapted to close said casing, a hollow cap mounted on the upper end of said gage cylinder, a hinged cork valve mounted in said cap and provided with an arm and valve, an air outlet passageway in said cap controlled by said valve, and means for regulating the admission of air through said passageway to the cap.

5. In a device of the character described, a casing having inwardly screw threaded ends, a flanged threaded cap forming a sediment chamber having an apertured diaphragm on its top, said cap being secured to the end of said casing, a flanged cap screwed to the other end of said casing and having a vertical annular threaded flange, and a central opening with a valve seat, a glass gage forming an auxiliary liquid supply reservoir having its lower end mounted on said cap, a gasket surrounding said end of the gage cylinder, an annular threaded ring engaging said cap and pressing said gasket against the cylinder, a flanged threaded hollow cap mounted on the upper end of said gage cylinder and held thereon by means of a cork gasket, and an annular threaded ring engaged with said cap, said cap having an air inlet passageway, means for automatically closing said air inlet, means for regulating the admission of air through the same, a coil mounted in said casing and having apertures in the upper inner side of its convolutions, the lower end of said coil projecting into the sediment chamber and the upper end being located at a point adjacent to the upper portion of the casing, a reticulated diaphragm separating the upper portion of said casing from the lower portion and located above said coil, a securing base portion mounted on the side of said casing and having vertical inlet and outlet passageways, the inlet passageway communicating with the upper end of said coil and the outlet passageway communicating with the upper end of said casing above said reticulated diaphragm.

In testimony whereof I hereunto affix my signature in presence of two witnesses.

ZEANITH H. STAMETS.

Witnesses:
LINA CONKLIN,
FRED. C. HART, Jr.